(12) United States Patent
Shikata

(10) Patent No.: US 12,041,376 B2
(45) Date of Patent: Jul. 16, 2024

(54) INFORMATION PROCESSING APPARATUS, SYSTEM, INFORMATION PROCESSING METHOD, AND STORAGE MEDIUM

(71) Applicant: CANON KABUSHIKI KAISHA, Tokyo (JP)

(72) Inventor: Yasushi Shikata, Port Washington, NY (US)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/752,031

(22) Filed: May 24, 2022

(65) Prior Publication Data

US 2022/0385835 A1    Dec. 1, 2022

(30) Foreign Application Priority Data

May 28, 2021    (JP) ................. 2021-090059

(51) Int. Cl.
*H04N 5/268* (2006.01)
*G06V 20/40* (2022.01)
(Continued)

(52) U.S. Cl.
CPC ............. *H04N 5/268* (2013.01); *G06V 20/40* (2022.01); *H04N 5/2628* (2013.01); *H04N 23/64* (2023.01); *H04N 23/90* (2023.01)

(58) Field of Classification Search
CPC ...... H04N 5/268; H04N 5/2628; H04N 23/64; H04N 23/90; H04N 23/667; H04N 23/681;
(Continued)

(56) References Cited

U.S. PATENT DOCUMENTS 9,113,083 B1 *   8/2015   Chou .................... H04N 23/67
2003/0030734 A1   2/2003   Gibbs et al.
(Continued)

FOREIGN PATENT DOCUMENTS

CN    108364336 A    8/2018
JP    2008-015756 A    1/2008
(Continued)

OTHER PUBLICATIONS

Extended European Search Report issued in corresponding EP Patent Application No. 22175736.2, dated Oct. 26, 2022.
(Continued)

*Primary Examiner* — Chong Wu
(74) *Attorney, Agent, or Firm* — Carter, DeLuca & Farrell LLP

(57) ABSTRACT

An information processing apparatus according to one embodiment of the present disclosure obtains image capturing information including information representing a position and an orientation of an image capturing device and movement information representing specific movement of the image capturing device; and generates viewpoint information representing a position of a virtual viewpoint and a view direction from the virtual viewpoint for generating a virtual viewpoint video based on the obtained image capturing information and the obtained movement information in a case where a captured image obtained by the image capturing device and the virtual viewpoint video generated based on a plurality of images are switched.

20 Claims, 14 Drawing Sheets

(51) Int. Cl.
*H04N 5/262* (2006.01)
*H04N 23/60* (2023.01)
*H04N 23/90* (2023.01)

(58) Field of Classification Search
CPC .............. H04N 23/695; H04N 23/951; H04N 21/21805; H04N 21/6587; H04N 13/111; H04N 13/117; H04N 5/2224; H04N 13/282; H04N 13/296; G06V 20/40; G06T 2215/16; G06T 15/20
See application file for complete search history.

(56) References Cited

U.S. PATENT DOCUMENTS

| 2016/0140768 | A1 | 5/2016 | Sako et al. |
| 2019/0174109 | A1 | 6/2019 | Yoshikawa et al. |
| 2020/0402281 | A1 | 12/2020 | Maruyama |
| 2022/0132030 | A1* | 4/2022 | Edpalm ................ H04N 19/132 |

FOREIGN PATENT DOCUMENTS

| JP | 2017-207650 A | 11/2017 |
| JP | 2020-042665 A | 3/2020 |
| JP | 2020-150417 A | 9/2020 |
| JP | 2020-205549 A | 12/2020 |
| WO | 2007061068 A1 | 5/2007 |
| WO | 2020184477 A1 | 9/2020 |

OTHER PUBLICATIONS

Notice of Reasons for Refusal issued by the Japanese Patent Office on Jun.4, 2024 in corresponding JP Patent Application No. 2021-090059, with English translation.

* cited by examiner

| TYPE |
|---|
| REAL CAMERA OPERATOR |
| VIRTUAL CAMERA OPERATOR |
| VIDEO SWITCHING OPERATOR |

FIG.1

| DETAILS | |
|---|---|
| CAMERA VIBRATION/ROTATION | AMOUNT OF VIBRATION IN X-, Y-, AND Z-DIRECTIONS |
| | AMOUNT OF ROTATION ABOUT X-, Y-, AND Z-AXES |
| CAMERA MOVEMENT | AMOUNT OF SMOOTHED MOVEMENT IN X-, Y-, AND Z-DIRECTIONS |
| ZOOM MOVEMENT | ZOOM VALUE |
| | MOVEMENT DIRECTION |
| | MOVING SPEED |

FIG.5

| TYPE | |
|---|---|
| CAMERA PATH 1 | OPERATION BY REAL CAMERA OPERATOR |
| CAMERA PATH 2 | OPERATION BY VIRTUAL CAMERA OPERATOR + CAMERA MOVEMENT SCHEDULE |
| CAMERA PATH 3 | OPERATION BY VIRTUAL CAMERA OPERATOR |
| CAMERA PATH 4 | OPERATION BY AUTOMATIC OPERATION MODE + CAMERA MOVEMENT SCHEDULE |

FIG.8

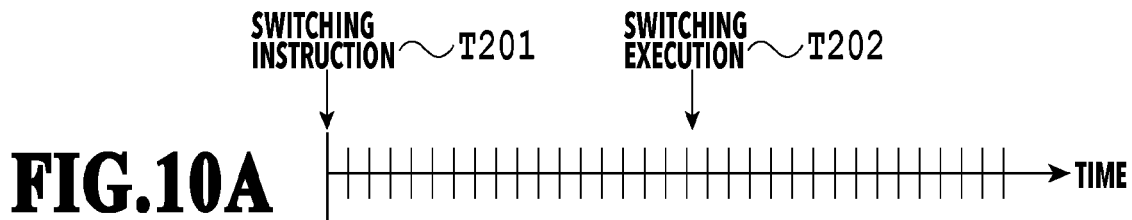
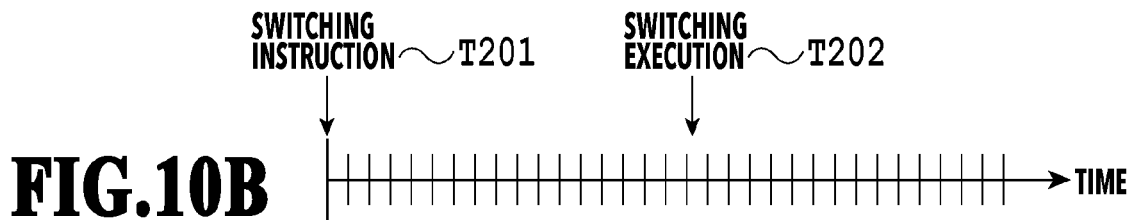

ND STORAGE MEDIUM

INFORMATION PROCESSING APPARATUS, SYSTEM, INFORMATION PROCESSING METHOD, AND STORAGE MEDIUM

BACKGROUND

Field

The present disclosure relates to a technique to generate a virtual viewpoint video.

Description of the Related Art

A technique has been attracting attention, which generates a virtual viewpoint video by installing a plurality of image capturing devices (cameras) at different positions, performing synchronous image capturing from multiple viewpoints, and using multi-valued videos obtained by the image capturing. As the technique such as this, Japanese Patent Laid-Open No. 2008-015756 has disclosed a technique to generate a virtual viewpoint video corresponding to a designated viewpoint (virtual viewpoint) by arranging a plurality of cameras so as to surround an object and using images of the object, which are captured by the plurality of cameras.

Further, in a case where an invent, such as soccer, for which image capturing from multiple viewpoints has been performed, is also captured by a physical camera (in the following, called real camera), such as a broadcast camera, it is possible to relay a television that combines the virtual viewpoint video and the real camera video captured by the real camera and distribute the combination in the internet. Japanese Patent Laid-Open No. 2020-42665 has disclosed a technique to switch seamlessly between the virtual viewpoint video and the real camera video by providing a unit configured to match the position, orientation, and viewing angle of the virtual viewpoint video to those of the real camera.

SUMMARY

However, with the technique of Japanese Patent Laid-Open No. 2020-42665, it is not possible to reproduce movement, for example, such as a camera shake of the real camera, in the virtual viewpoint video. As described above, in a case where the real camera video and the virtual viewpoint video are switched, there is such a problem that a difference between the real camera video and the virtual viewpoint video becomes more likely to be recognized by a user because the movement of the real camera is not reflected.

Consequently, in view of the above-described problem, an object of the present disclosure is to provide a technique to less the sense of incongruity of a user in a case where the real camera video and the virtual viewpoint video are switched.

One embodiment of the present disclosure is an information processing apparatus including: one or more memories storing instructions; and one or more processors executing the instruction to: obtain image capturing information including information representing a position and an orientation of an image capturing device and movement information representing specific movement of the image capturing device; and generate viewpoint information representing a position of a virtual viewpoint and a view direction from the virtual viewpoint for generating a virtual viewpoint video based on the obtained image capturing information and the movement information in a case where a captured image obtained by the image capturing device and the virtual viewpoint video generated based on a plurality of images are switched.

Further features of the present disclosure will become apparent from the following description of exemplary embodiments with reference to the attached drawings.

BRIEF DESCRIPTION OF THE DRAWINGS

FIG. 1 a diagram showing types of operator operating a system according to a first embodiment;

FIG. 5 is itemized camera parameters according to the first embodiment;

FIG. 8 shows types of camera path according to the first embodiment;

FIG. 10A and FIG. 10B are each an example of a camera movement schedule at the time of switching from virtual viewpoint videos to real camera videos according the first embodiment;

FIG. 12 is a diagram showing the relationship of FIG. 12A and FIG. 12B;

DESCRIPTION OF THE EMBODIMENTS

In the following, embodiments are explained with reference to the drawings. The configurations shown in the following embodiments are merely exemplary and the idea of the present disclosure is not limited the configurations shown schematically.

First Embodiment

System Configuration

An information processing system in the present embodiment is explained. The information processing system in the present embodiment has a function to output by switching between a captured video (in the following, also called real camera video) of an image capturing device (in the following, called real camera) for performing image capturing actually, for example, such as a broadcast camera, and a virtual viewpoint video corresponding to a virtual viewpoint. The virtual viewpoint is a viewpoint designated by a user. Further, in the following explanation, for convenience of explanation, explanation is given by using a camera (in the following, called virtual camera) that is virtually arranged at the position of a virtual viewpoint. That is, the position of the virtual viewpoint and the view direction from the virtual viewpoint correspond to the position and the orientation of the virtual camera. Further, the field of vision (visual field) from the virtual viewpoint corresponds to the viewing angle of the virtual camera.

Further, the virtual viewpoint video in the present embodiment is also called a free-viewpoint video but the virtual viewpoint video is not limited to the video corresponding to the viewpoint designated freely (arbitrarily) by a user and for example, an image or the like corresponding to the viewpoint selected by a user from a plurality of candidates is also included in the virtual viewpoint video. Further, in the present embodiment, a case is explained mainly where designation of a virtual viewpoint is performed by a user operation, but it may also be possible for designation of a virtual viewpoint to be performed automatically based on results of image analysis and the like. Further, in the present embodiment, a case where the virtual viewpoint video is a moving image is mainly explained. It can be said that the virtual viewpoint video is a video that is captured by a virtual camera.

FIG. 1 is a diagram showing types of operator on the information processing system according to the present embodiment. The operators that operate the present system includes at least three types of operator, that is, a real camera operator that operates a real camera, a virtual camera operator that operates a virtual camera, and a video switching operator that operates the switching operation between a real camera video and a virtual viewpoint video. There may be plurality of operators or one operator may perform the roles of the different types of operator. Further, the operator does not need to be a person and for example, may be programmed software.

Figure 2:
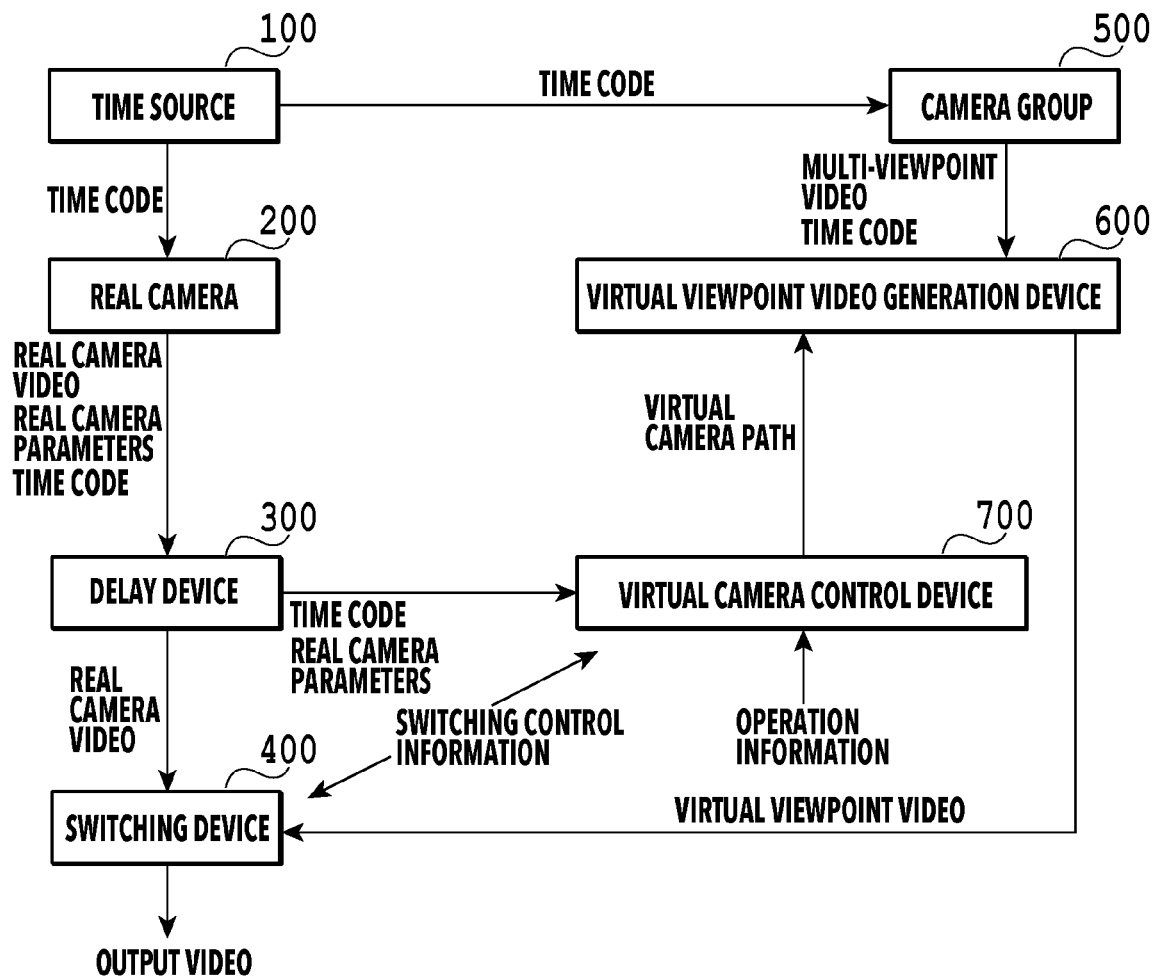
FIG. 2 is a block diagram showing a configuration of the system according to the first embodiment.

FIG. 2 is a block diagram showing the configuration of the information processing system according to the present embodiment. The present system has a time source 100, a real camera 200, a delay device 300, a switching device 400, a camera group 500, a virtual viewpoint video generation device 600, and a virtual camera control device 700.

The time source 100 outputs time information (in the following, described as "time code") to the real camera 200 and the cameral group 500. The real camera 200 and the cameral group 500 perform image capturing at the same timing based on this time code and output the videos captured at the same timing to the outside.

The real camera 200 is a hand-held camera and the like, such as that in the broadcast studio, which is installed at the side and the like of a game field, and the position, orientation, and viewing angle of the real camera 200 are controlled by the real camera operator. The real camera 200 outputs the captured video (in the following, described as "real camera video") and the time code to the delay device 300. The real camera 200 incorporates a measuring device (sensor), such as a GPS sensor, a gyro sensor, and an acceleration sensor having a reception unit or the measuring device such as this is attached to the external of the real camera 200. The real camera 200 outputs the sensor information and the image capturing information including the information representing the position, orientation, and viewing angle (zoom value) of the real camera (in the following, these pieces of information are together descried as "real camera parameters") to the delay device 300 as well as the real camera video. In FIG. 2, the example in which there is one real camera is explained, but it may also be possible for the system to have a plurality of real cameras. Further, the type of real camera is not limited to the hand-held camera. For example, the real camera may a camera that is controlled by a pan head, a camera that is controlled in a state of being sustained by a wire or the like, and a non-moving type camera.

The delay device 300 saves the real camera video that is output from the real camera 200 and the real camera parameters in a built-in memory or in an externally attached memory. Then, the delay device 300 outputs the saved real camera video to the switching device 400 after delaying a predetermined time set in advance. The delay device 300 is used in the switching device 400 for adjusting the timing at which at which the real camera video and the virtual viewpoint video are switched. Normally, the virtual viewpoint video having the same time code as that of the real camera video requires time for processing to generate a virtual viewpoint video, and therefore, a delay of several frames to several tens of seconds will occur. The delay device 300 has a role of absorbing the processing delay. Further, the delay device 300 outputs the saved real camera parameters and the time code corresponding to the real camera parameters to the virtual camera control device 700 at predetermined timing set in advance.

To the switching device 400, the real camera video that is transmitted by the delay device 300 and the virtual viewpoint video that is transmitted by the virtual viewpoint video generation device 600 are input. The switching device 400 receives switching control information that is set by the video switching operator and outputs one of the real camera video and the virtual viewpoint video based on the received switching control information. Here, by the delay device 300, the real camera video and the virtual viewpoint video, which are captured with the same time code, are input to the switching device 400 at the same timing. Because of this, in the switching device 400, only by switching the videos that are output, the videos of the same time code are switched. FIG. 2 shows the aspect in which the delay device 300 and the switching device 400 are separate, but the aspect may be one in which the switching device 400 incorporates the delay device 300. In this case, in the switching device 400 to which the time code-attached virtual viewpoint video that is transmitted by the virtual viewpoint video generation device 600 is input, the switching between the videos of the same time code is performed.

The camera group includes a plurality of image capturing devices that are installed so as to surround a game filed and the like. In the present embodiment, it is assumed that the image capturing device (camera) included in the camera group 500 is a camera different from the real camera 200. The captured image that is obtained by the camera group 500 is used to generate a virtual viewpoint video. Each video captured by the camera group 500 is output to the virtual viewpoint video generation device 600. The real camera 200 may a camera that is included in the camera group 500.

The virtual viewpoint video generation device 600 creates a three-dimensional model from multi-viewpoint videos and generates a virtual viewpoint video by mapping texture in accordance with the position of the virtual viewpoint and the view direction from the virtual viewpoint. Here, it is assumed that information on the position, orientation, and viewing angle of each camera of the camera group 500 is already measured and obtained and based on the information and the multi-viewpoint videos, a three-dimensional model is created. Then, the virtual viewpoint video generation device 600 outputs the virtual viewpoint video generated based on the three-dimensional model to the switching device 400.

The virtual camera control device 700 generates a virtual camera path representing the movement path of the virtual camera based on the operation information that is input by the virtual camera operator. The virtual camera path is information representing not only the movement path of the position of the virtual camera but also a change in the orientation, viewing angle and the like of the virtual camera and is also called virtual viewpoint information. The virtual camera path in the present embodiment includes the information on the position orientation, and viewing angle of the virtual camera, and the time code. In the following explanation, there is a case where the virtual camera path is simply described as camera path.

The virtual camera control device 700 outputs the generated virtual camera path to the virtual viewpoint video generation device 600 The virtual camera control device 700 outputs the generated virtual camera path for each frame or outputs a plurality of camera paths corresponding to several to several thousand frames at a time. At this time, the virtual camera control device 700 reflects the movement of the camera shake and the like of the real camera based on the real camera parameters and the time code, which are transmitted by the delay device 300 and saved in the memory within the virtual camera control device 700, in the virtual camera path. This is the important feature of the present embodiment and detailed will be described later. It may also be possible for the virtual camera control device 700 to directly input the real camera parameters and the time code from the real camera 200.

Configuration of Virtual Camera Control Device

Figure 3:
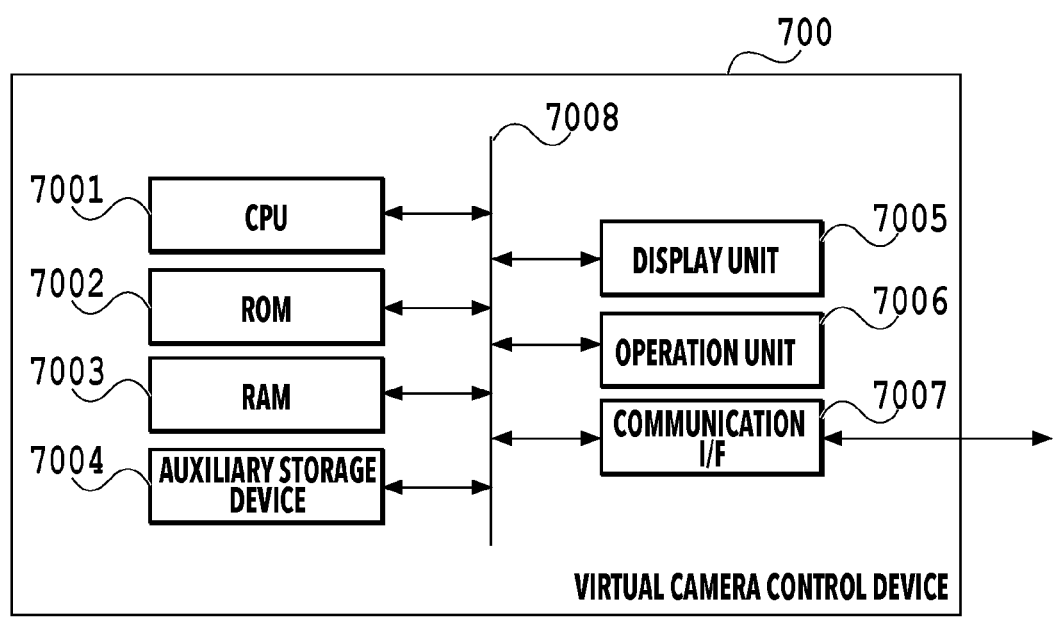
FIG. 3 is a block diagram showing a hardware configuration of a virtual camera control device 700 according to the first embodiment.

In the following, configuration of the virtual camera control device 700 according to the present embodiment is explained by using FIG. 3 and FIG. 4. FIG. 3 is a block diagram showing the hardware configuration of the virtual camera control device 700.

The virtual camera control device 700 has a CPU 7001, a ROM 7002, a RAM 7003, an auxiliary storage unit 7004, a display unit 7005, an operation unit 7006, a communication I/F 7007, and a bust 7008.

Figure 4:
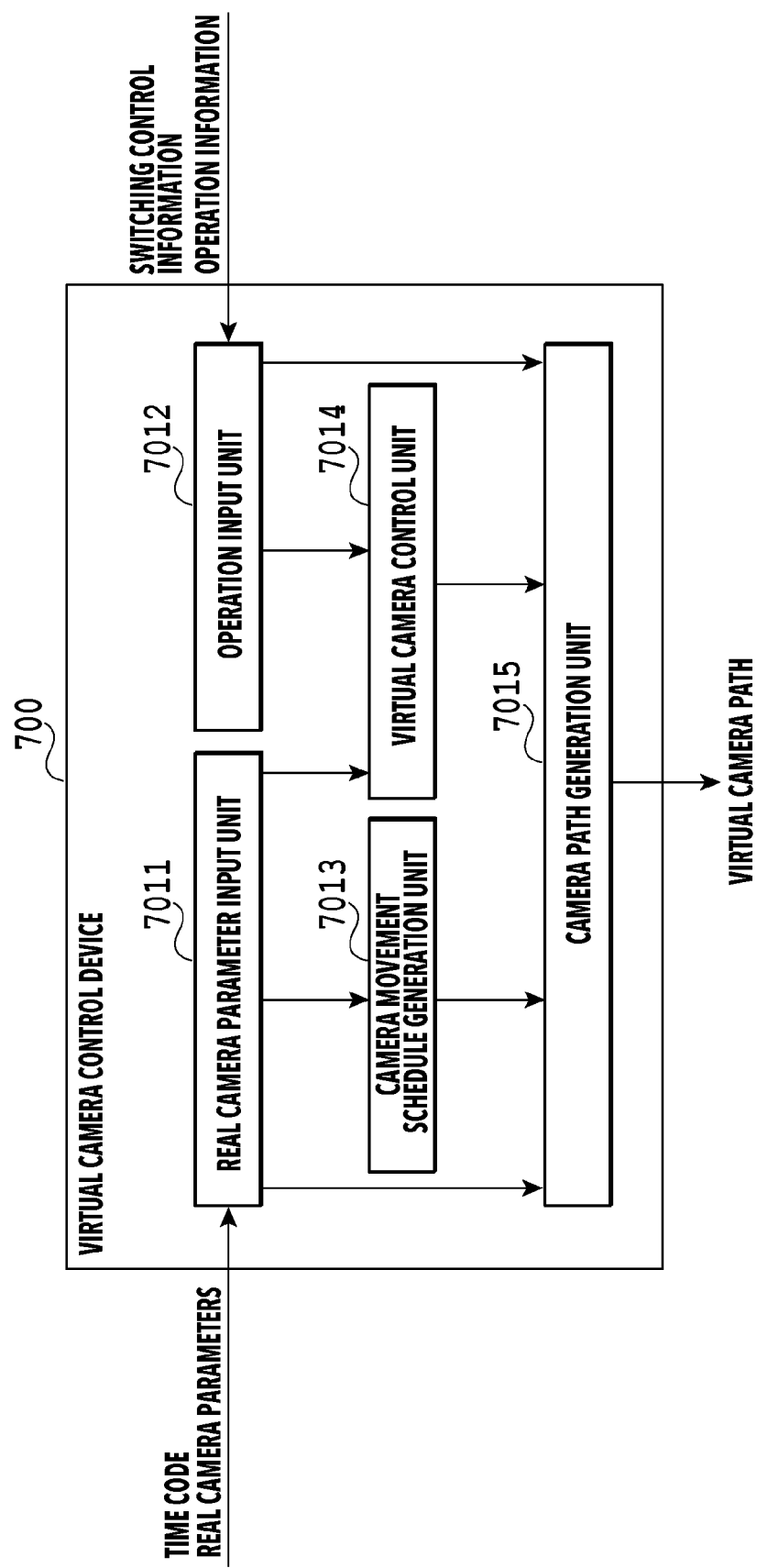
FIG. 4 is a block diagram showing a software configuration of the virtual camera control unit 700 according to the first embodiment.

The CPU 7001 implements each function module of the virtual camera control device 700 shown in FIG. 4 by controlling the entire virtual camera control device 700 by using computer programs and data stored in the ROM 7002 or the RAM 7003. It may also be possible for the virtual camera control device 700 to have one piece or a plurality of pieces of dedicated hardware different from the CPU 7001 and for the dedicated hardware to perform at least part of the processing by the CPU 7001. As examples of the dedicated hardware, there are an ASIC (Application-Specific Integrated Circuit), an FPGA (Field Programmable Gate Array), and a DSP (Digital Signal Processor) and the like. In the ROM 7002, programs and the like that do not need to be changed are stored. In the RAM 7003, programs and data that are provided from the auxiliary storage device 7004 and data and the like that are supplied from the outside via the communication I/F 7007 are temporarily stored. The auxiliary storage device 7004 includes, for example, a hard disk drive and the like and in the auxiliary storage device 7004, various kinds of data, such as image data and voice data, are stored.

The display unit 7005 includes, for example, a liquid crystal display, an LED and the like and on which, a GUI (Graphical User Interface) and the like for a user to operate the virtual camera control device 700 is displayed. The operation unit 7006 includes, for example, a keyboard, a mouse, a joystick, a touch panel and the like and inputs various instructions to the CPU 7001 upon receipt of the operation by a user. The communication I/F 7007 is used for communication between the virtual camera control device 700 and a device outside the virtual camera control device 700. For example, in case where the virtual camera control device 700 is connected with an external device by wire, a communication cable is connected to the communication I/F 7007. In a case where the virtual camera control device 700 has a function to wirelessly communicate with an external device, the communication I/F 7007 has an antenna. The bus 7008 connects each of the units of the virtual camera control device 700 and transmits information.

In the present embodiment, it is assumed that the display unit 7005 and the operation unit 7006 exist inside the virtual camera control device 700, but it may also be possible for at least one of the display unit 7005 and the operation unit 7006 to exist outside the virtual camera control device 700 as another device. In this case, it may also be possible for the CPU 7001 to operate as a display control unit configured to control the display unit 7005 or as an operation control unit configured to control operation unit 7006.

The hardware configuration of the devices other than the virtual camera control device 700 of the information processing system according to the present embodiment is the same as the configuration of the virtual camera control device 700.

FIG. 4 is a block diagram showing the function configuration of the virtual camera control device 700 The virtual camera control device 700 has a real camera parameter input unit 7011, an operation input unit 7012, a camera movement schedule generation unit 7013, a virtual camera control unit 7014, and a camera path generation unit 7015. The camera path generation unit is also called a viewpoint information generation unit.

The real camera parameter input unit 7011 outputs the real camera parameters and the time code, which are input from the outside of the virtual camera control device 700, to the camera movement schedule generation unit 7013, the virtual camera control unit 7014, and the camera path generation unit 7015. The operation input unit 7012 outputs the operation information on the virtual camera operator, which is input from the outside of the virtual camera control device 700, to the virtual camera control unit 7014 and the camera path generation unit 7015. Further, the operation input unit 7012 outputs the switching control information on the video switching operator, which is input from the outside of the virtual camera control device 700, to the camera path generation unit 7015. The camera movement schedule generation unit 7013 generates a cameral movement schedule based on the real camera parameters and output the generated camera movement schedule to the camera path generation unit 7015. The camera movement schedule will be described later.

The virtual camera control unit 7014 generates a camera path for an automatic operation mode based on the operation information and the real camera parameters and outputs the generated camera path to the camera path generation unit 7015. The automatic operation mode is a mode used to gradually put the composition of the virtual viewpoint video close to the composition of the real cameral video. That is, in the automatic operation mode, the control is performed so that the difference between the position of the virtual camera and the position of the real camera becomes smaller. Similarly, in the automatic operation mode, the control is performed so that the difference between the orientation of the virtual camera and the orientation of the real camera becomes smaller. Similarly, in the automatic operation mode, the control is performed so that the difference between the viewing angle of the virtual camera and the viewing angle the real camera becomes smaller.

As above, in the automatic operation mode, the position, orientation, and viewing angle of the virtual camera are changed as to gradually become close to the position, orientation, and viewing angle of the real camera. Due to this, the composition of the virtual viewpoint video corresponding to the appearance from the virtual camera and the composition of the real camera video corresponding to the appearance from the real camera change so that they become close to each other. The camera path generation unit 7015 generates a camera path based on the input various kinds of information and outputs the generated camera path to the virtual viewpoint video generation device 600.

Example of Movement Information

FIG. 5 shows itemized real camera parameters. The real camera parameters include parameters of the movement information on the real camera 200, in addiction to each parameter, such as the position, the orientation, and the zoom value, of the real camera. The movement information is (1) information relating to the vibration and rotation of the real camera, such as the amount of vibration and the amount of rotation, of the real camera 200, (2) information relating to the movement of the real camera, such as the movement direction, the moving speed, and the amount of movement, of the real camera 200, and (3) information relating to the zoom movement, such as the zoom value, the movement direction, and the moving speed.

The amount of vibration of the real camera 200 is the amount of change per predetermine time for each direction (X-direction, Y-direction, and Z-direction) in a three-dimensional orthogonal coordinate system in which a predetermined position of the casing of the real camera 200 is taken to be the origin. This information is obtained, for example, from the acceleration sensor of the real camera 200.

The amount of rotation of the real camera 200 is the amount of change per predetermined time in a case where the X-axis, the Y-axis, or the Z-axis is taken to be the center axis. This information is obtained by, for example, from the gyrosensor of the real camera 200.

The amount of movement of the real camera 200 is the amount of change in which the casing of the real camera 200 moves. As this amount of change, it may be possible to use a value obtained by adding and smoothing the amount of vibration, the amount of rotation and the like, which are described previously, in a predetermined time. Alternatively, it may also be possible to measure the amount of movement of the real camera 200 by using a GPS sensor.

The value of zoom (so-called zoom value) is the focal length value of the real camera 200. The movement direction of zoom refers to the wide-angle direction or the telephoto direction. The moving speed of zoom is the amount of change in the focus length during a predetermine time. The information is obtained from, for example, the sensor incorporated in the lens.

It may be possible for the movement information not to include all the information described above and for example, the configuration of the movement information may be one including at least any information in (1) to (3). Further, the movement information may include information other than the above-described information.

The movement information in the present embodiment is information representing the vibration of the real camera 200, the camera shake, the misalignment, the zoom shift and the like. However, the real camera 200 is a camera capable of controlling the position, the orientation, and the viewing angle and the movement of the real camera by this control and the movement represented by the above-described movement information may be different. Consequently, it is assumed that the movement of the real camera represented by the movement information is specific movement that satisfies, for example, the following conditions. That is, the movement represented by the movement information may be the movement of the real camera observed while the position, orientation, zoom and the like of the real camera are not controlled. Further, the movement represented by the movement information may be the movement whose amount of change in the position, orientation, and zoom during a predetermined time is less than a threshold value.

Flow of Video Switching

Figure 6:
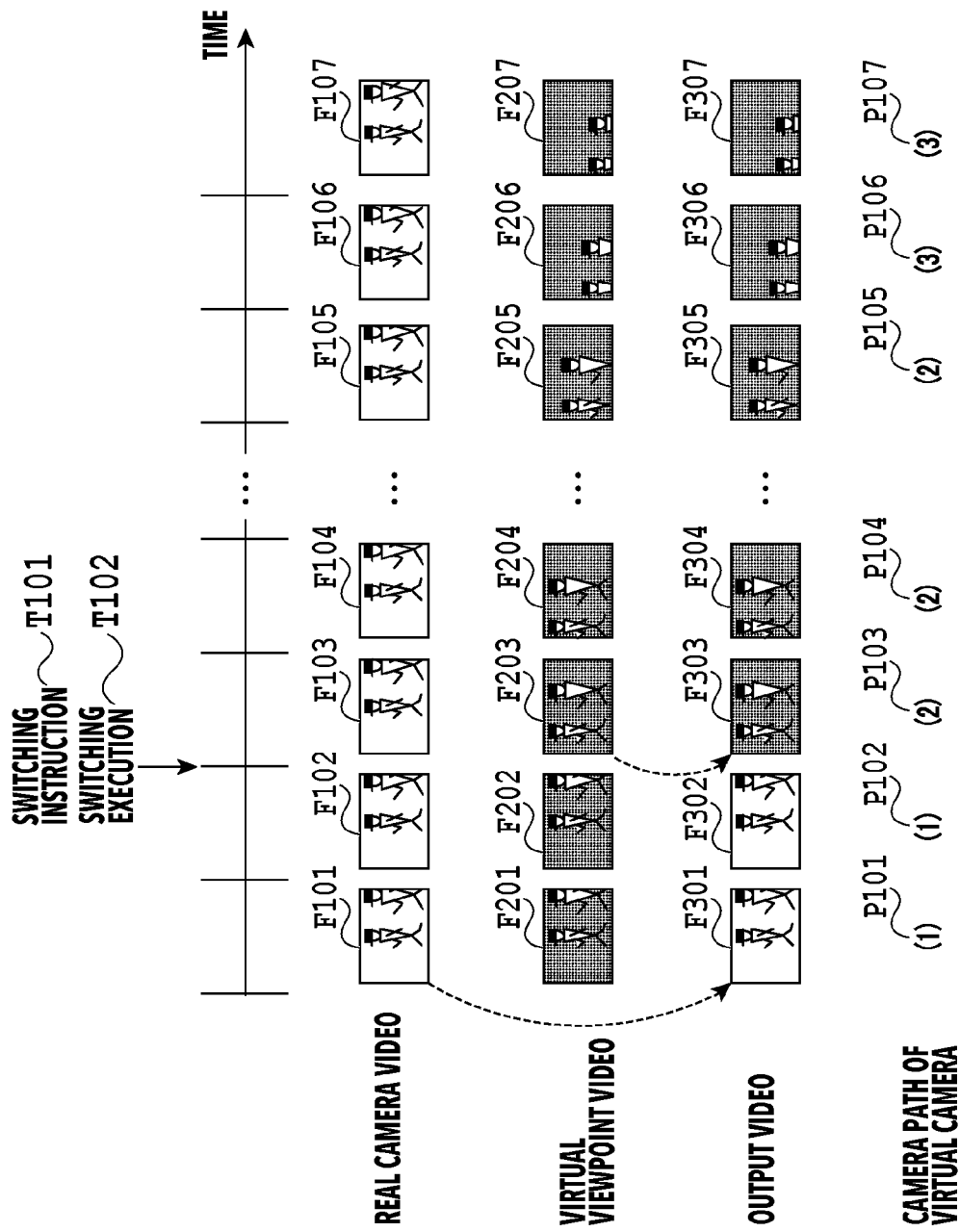
FIG. 6 shows a flow of switching from real camera videos to virtual viewpoint videos according to the first embodiment.
Figure 7:
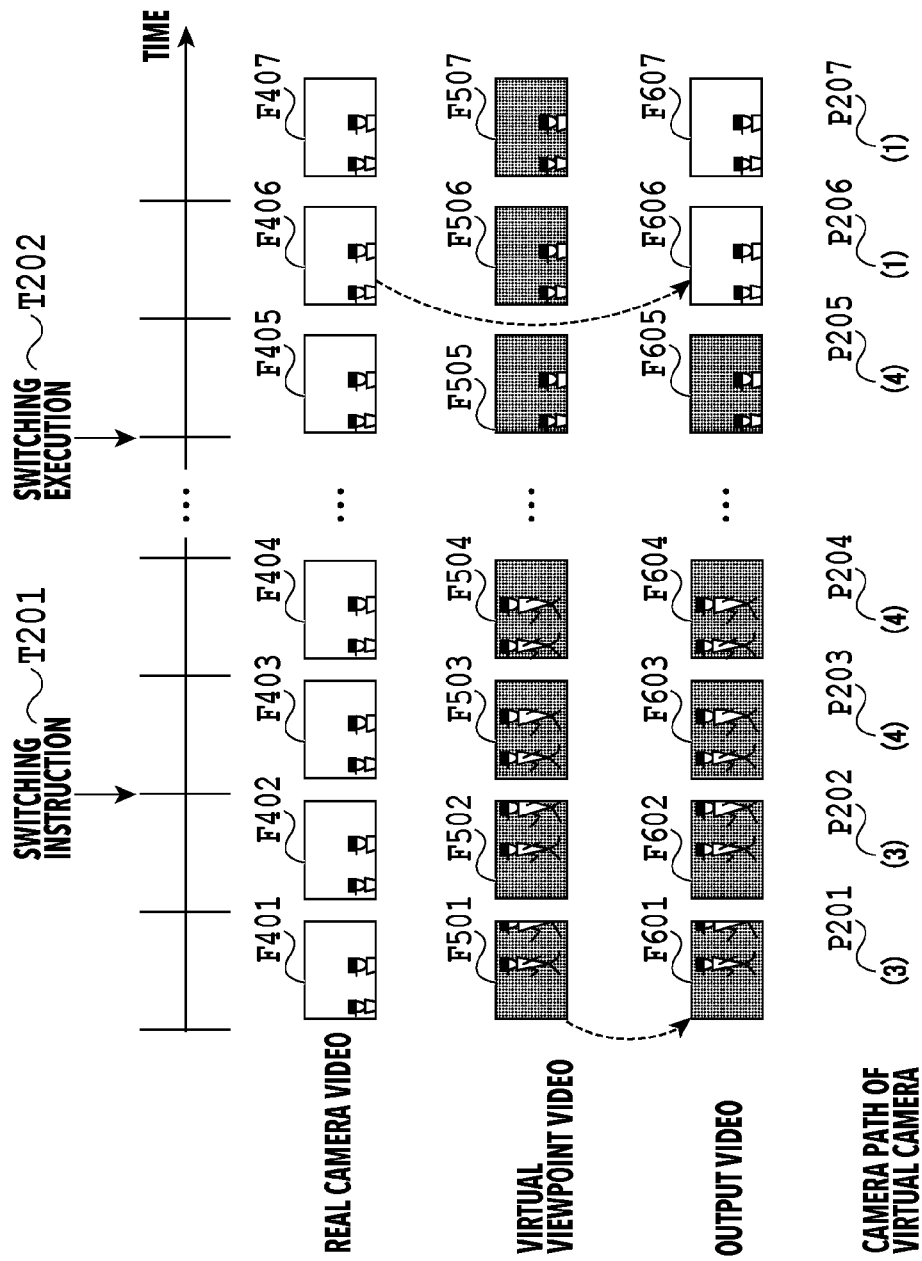
FIG. 7 shows a flow of switching from virtual viewpoint videos to real camera videos according the first embodiment.

FIG. 6 and FIG. 7 each show an outline of video switching according to the present embodiment. First, by using FIG. 6, a flow of switching from a real camera video to a virtual viewpoint video is explained.

Switching instruction timing T101 is timing at which a video switching operator inputs switching control information to the switching device 400. Further, switching execution timing T102 is timing at which the switching device 400 having received the switching instructions actually performs switching from the real camera video to the virtual viewpoint video. The switching from the real camera video to the virtual viewpoint video may be performed immediately upon receipt of the switching instructions of the video switching operator, or may be performed after a predetermined time determined in advance elapses from the reception of the switching instructions. FIG. 6 shows an example in which switching is performed immediately.

Real camera videos F101 to F107 are each a real camera video for each frame, which is input from the delay device 300 to the switching device 400.

Virtual viewpoint videos F201 to F207 are each a virtual viewpoint video for each frame, which is input from the virtual viewpoint video generation device 600 to the switching device 400.

Output videos F301 to F307 are each a video that is one of the real camera video and the virtual viewpoint video, which is output selectively by the switching device 400. In FIG. 6, as the output videos F301 to F302, the real camera videos F101-F102 are selected. Further, triggered by the switching execution, at the switching execution timing T102 and later, as the output videos F303-F307, the virtual viewpoint videos F203 to F207 are selected.

In FIG. 6, camera paths P101 to P107 of the virtual camera each show the type of camera path that is output from the virtual camera control device 700 to the virtual viewpoint video generation device 600.

Here, the type of virtual camera path is explained. FIG. 8 shows the type of virtual cameral path. In the present embodiment, it is assumed the four camera paths, that is, the first camera path to the fourth camera path are utilized. In the present specification, in FIG. 8 and the like, these camera paths are described as cameral paths 1 to 4 and in FIG. 6 and FIG. 7, these camera paths are represented as (1) to (4).

The camera path 1 a virtual camera path representing the operation by the real camera operator. The composition of the virtual viewpoint video in a case where this camera path 1 is adopted is the same as the composition of the real camera video. The camera path 2 is a virtual camera path representing the operation by the virtual camera operator, to which, the operation in accordance with the camera movement schedule is added. The camera path 3 is a virtual camera path representing the operation by the virtual camera operator. The camera path 4 a virtual camera path representing the operation by the automatic operation mode, to which the operation in accordance with the camera movement schedule is added.

The symbols P101 to P107 in FIG. 6 each show a transition of the virtual camera path in this example. First, triggered by the switching execution, the virtual camera path switches from the camera path 1 (P102) to the camera path 2 (P103). This switching timing is timing at which the output video switches from the real camera video (output video F302) to the virtual viewpoint video (output video F303), but the real camera video and the virtual viewpoint video have the same configuration, and therefore, there is seemingly no change. After the switching execution timing T102, the virtual viewpoint video is the video based on the camera path 2. As described previously, the camera path 2 represents the operation of the virtual camera operator, to which the operation by the camera movement schedule is added, and therefore, the movement information on the vibration, the movement, the zoom operation and the like of the camera by the real camera operator is taken over. The vibration, such as a camera shake, is gradually relaxed after that. The camera movement schedule represents the way of this relaxation as a schedule, and in which the amount of vibration and the like are determined in advance for each frame. In a case where the vibration converges, that is, in a case where the camera movement schedule ends, the camera path 2 (P105) switches to the camera path 3 (P106). This means that the operation becomes the operation only by the virtual camera operator.

Next, by using FIG. 7, the flow of switching from the virtual viewpoint video to the real camera video is explained.

Switching instruction timing T201 is timing at which the video switching operator inputs the switching control information to the switching device 400. Further, switching execution timing T202 is timing at which the switching device 400 having received the switching instructions actually performs switching from the virtual viewpoint video to the real camera video. Normally, the composition of the virtual viewpoint video and the composition of the real camera video are different. Consequently, in order to implement smooth switching, it is necessary to once gradually put the composition of the virtual viewpoint video to the composition of the real camera video and finally match both with each other in the virtual viewpoint video. Because of this, the switching instruction timing T201 and the switching execution timing T202 are different. Specifically, the switching execution timing T202 is delayed from the switching instruction timing T201.

Real camera videos F401 to F407 are each a real camera video for each frame, which is input to the switching device 400 from the delay device 300.

Virtual viewpoint videos F501 to F507 are each a virtual viewpoint video for each frame, which is input to the switching device 400 from the virtual viewpoint video generation device 600.

Output videos F601 to F607 are each a video that is one of the real camera video and the virtual viewpoint video, which is output selectively by the switching device 400. In FIG. 7, as the output videos F601 to F605, the virtual viewpoint videos F501 to F505 are selected. Further, triggered by the switching execution, after a certain amount of time elapses from the switching execution timing T202, as the output videos F606 to F607, the real camera videos F406 to F407 are selected.

Symbols P201 to P207 in FIG. 7 each show a transition of the virtual camera path that the virtual camera control device 700 outputs to the virtual viewpoint video generation device 600. First, triggered by the switching instructions at the switching instruction timing T201, the virtual camera path switches from the camera path 3 (P202) to the camera path 4 (P203). As described previously, the camera path 4 represents the operation by the automatic operation mode and by this switching, after this, the composition of the virtual viewpoint video becomes gradually close to the composition of the real camera video. Further, to the camera path 4, the operation information represented by the camera movement schedule is also added. Consequently, the movement information, such as a camera shake that occurs in the real camera video, is gradually added to the information for generating a virtual viewpoint video.

Next, triggered by the switching execution at the switching execution timing T202, the virtual camera path switches from the camera path 4 (P205) to the camera path 1 (P206). This switching timing is timing at which the output video switches from the virtual viewpoint video (output video F605) to the real camera video (output video F606), but the real camera video and the virtual viewpoint video have the same configuration, and therefore, there is seemingly no change. Further, at this timing, the movement information that is added to the information for generating a virtual viewpoint video by the camera movement schedule is the same as the movement information on the real camera video. Because of this, there seemingly occurs no sense of incongruity. After this, the composition of the virtual viewpoint video is the video based on the camera path 1, that is, the composition is the same as the composition of the real camera video.

The composition of the virtual viewpoint video and the composition of the real camera video at the time of switching do not need to match with each other completely. For example, the composition of the virtual viewpoint video at the time of switching may be controlled as to satisfy a predetermined reference. The predetermined reference may be that, for example, the difference between the size of the object included in the virtual viewpoint video and the size of the same object included in the real camera video is smaller than a threshold value. Further, the predetermined reference may that the difference in position, the difference in orientation, and the difference in viewing angle between the virtual camera and the real camera are smaller than a threshold value.

Example of Camera Movement Schedule

Figure 9A:
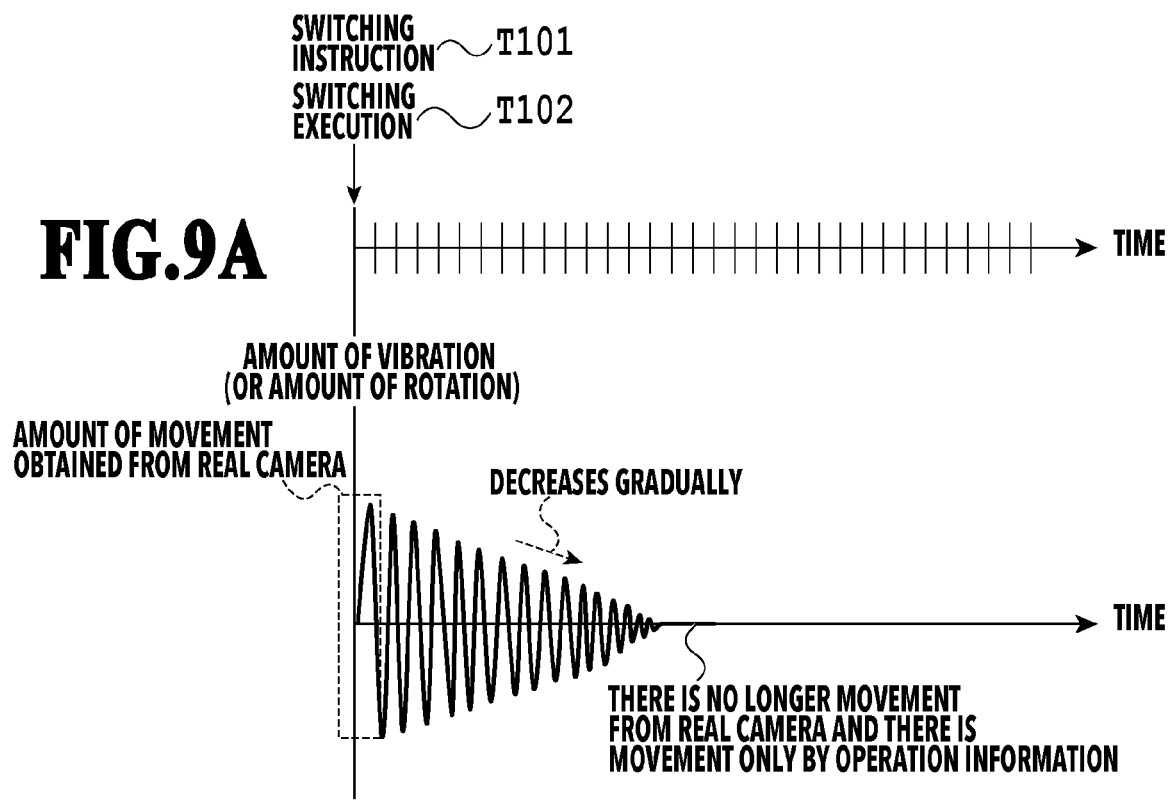
FIG. 9A and FIG. 9B are each an example of a camera movement schedule at the time of switching from real camera videos to virtual viewpoint videos according the first embodiment.
Figure 9B:
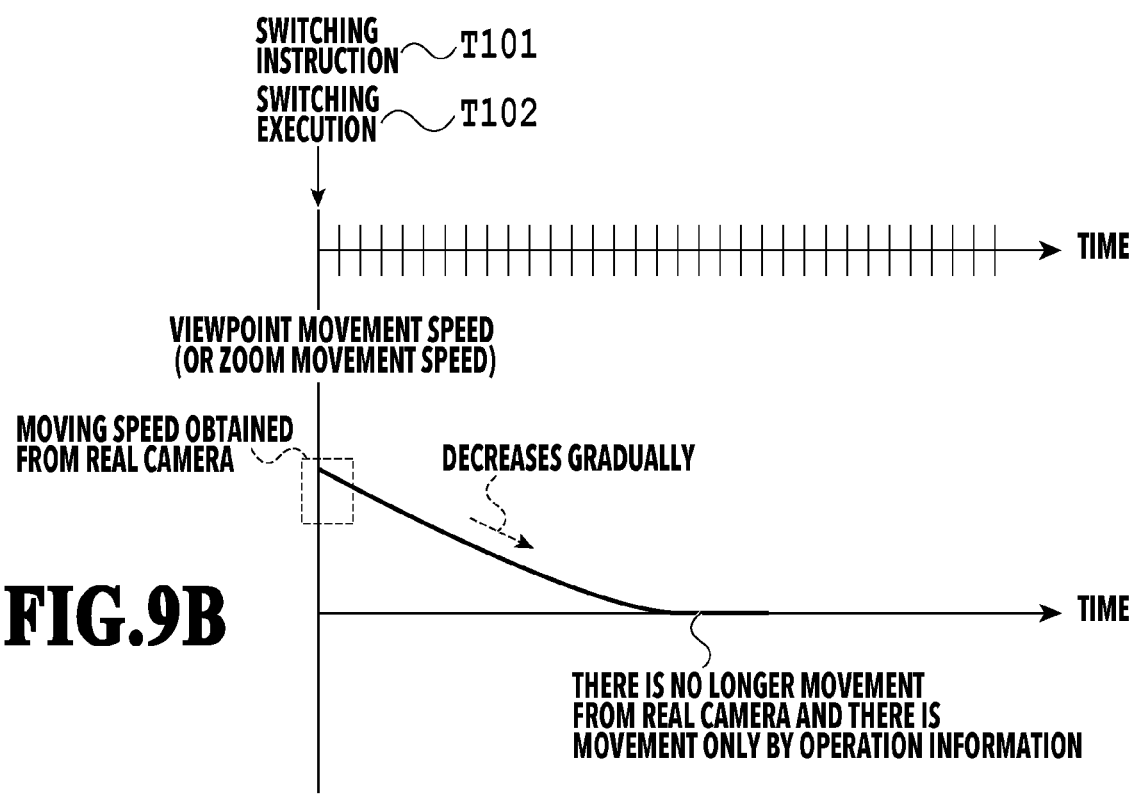

FIG. 9A and FIG. 9B each show an example of a camera movement schedule that is used at the time of switching from a real camera video to a virtual viewpoint video. Specifically, FIG. 9A shows the way the amount of vibration (or rotation) on a virtual viewpoint video changes (decreases) in the time direction. In FIG. 9A and FIG. 9B, only one direction in the XYZ orthogonal coordinates is described in a simplified manner.

The camera movement schedule is updated by obtaining real camera parameters for each frame cycle while the real camera video is being output from the switching device 400 (F301 to F302 in FIG. 6). Because of this, immediately after the switching to the virtual viewpoint video (F303 in FIG. 6) in response to the switching execution at the switching execution timing T102, the substantially the same value as that of the amount vibration of the real camera 200 immediately previously and the substantially the same value as that of the amount of rotation of the real camera 200 are reproduced on the virtual viewpoint video. After switching to the virtual viewpoint video, the updating of the camera movement schedule stops and after that, in accordance with the camera movement schedule, the operation of the amount of vibration and the amount of rotation for each frame is added to the operation of the virtual camera operator. Each of the amount of vibration and the amount of rotation gradually decreases with a predetermined coefficient (F303-F305 in FIG. 6). Then, at the point in time of completion of the camera movement schedule, that is, at the point in time at which the vibration and rotation converge, the operation switches to the operation only by the virtual camera operator (F306, P106 in FIG. 6). In order to provide the constant state where the normal amount of vibration slightly remains in the camera video, it may also be possible to adopt a camera movement schedule that leaves the minimum constant amount of vibration at all times.

FIG. 9B shows another example of the camera movement schedule and shows the way the viewpoint movement speed (or zoom movement speed) on the virtual viewpoint video changes (decreases) in the time direction. The operation of the camera movement schedule is the same as that in FIG. 9A.

FIG. 10A and FIG. 10B each show an example of a camera movement schedule that is used at the time of switching from a virtual viewpoint video to a real camera video. Specifically, FIG. 10A shows the way the amount of vibration (or the amount of rotation) on the virtual viewpoint video changes (increases) in the time direction. In FIG. 10A and FIG. 10B, only one direction in the XYZ orthogonal coordinates is described in a simplified manner.

The camera movement schedule is updated by obtaining real camera parameters for each frame cycle until the switching instructions at the switching instruction timing T201 are input (F601 to F602 in FIG. 7). The waveform shape of the camera movement schedule is the shape opposite to that at the time of switching from the real camera video to the virtual viewpoint video (see FIG. 9A and FIG. 9B).

After that, at the switching execution timing T202 at which switching is performed (F603 and later in FIG. 7), in accordance with the camera movement schedule, the amount of vibration and the amount of rotation on the virtual viewpoint video are reproduced so as to gradually become close to the amount of vibration and the amount of rotation of the real camera 200. After that, at the point in time at which the amount of vibration and the amount of rotation become substantially the same as those of the real camera 200, the video switches to the real camera video (F606 in FIG. 7).

FIG. 10B shows another example of the camera movement schedule and shows the way the viewpoint movement speed (or the zoom movement speed) on the virtual viewpoint video changes (increases) in the time direction. The operation of the camera movement schedule is the same as that in FIG. 10A.

Generation Flow of Camera Movement Schedule

Figure 11:
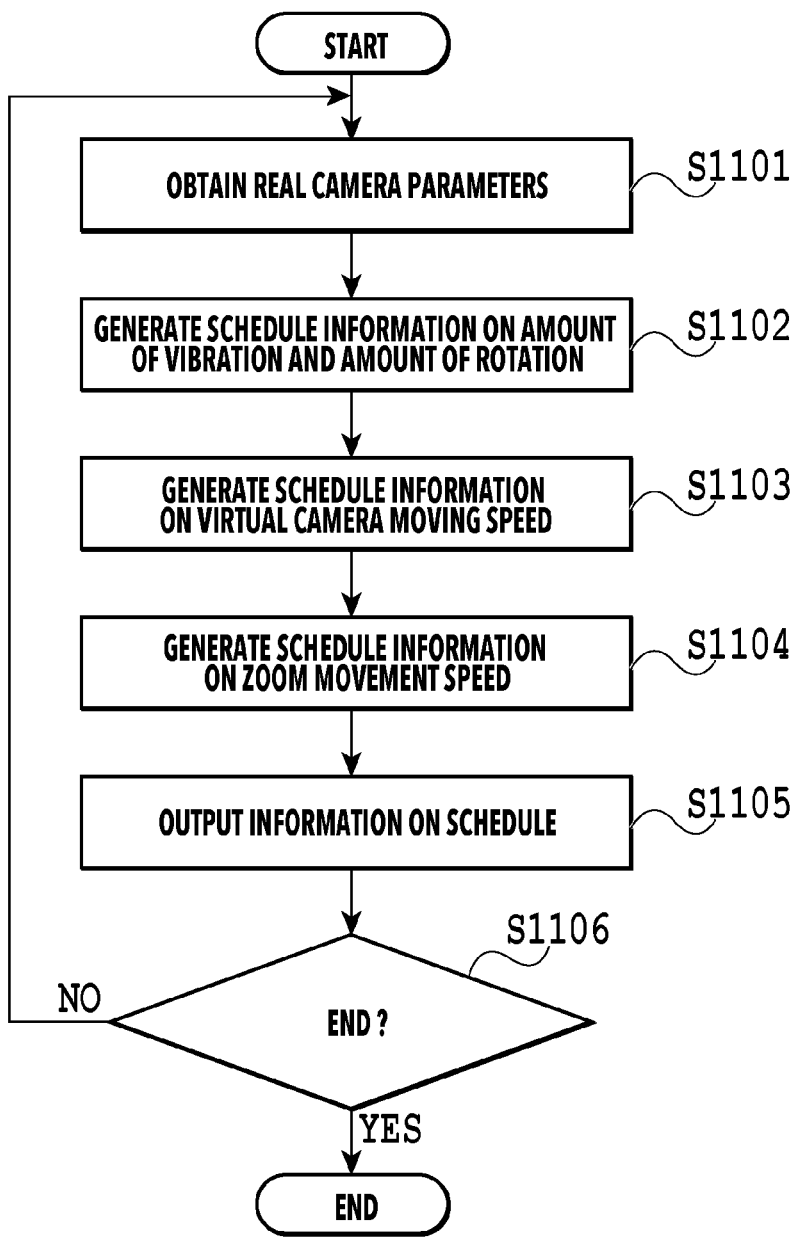
FIG. 11 is flowchart of camera movement schedule generation processing according to the first embodiment.

FIG. 11 is a flowchart showing a flow of generation processing of a camera movement schedule according to the present embodiment.

At step S1101, the camera movement schedule generation unit 7013 obtains the real camera parameters transmitted by the real camera parameter input unit 7011. In the following, "step S-" is abbreviated to "S-".

At S1102, the camera movement schedule generation unit 7013 generates schedule information on the amount of vibration and the amount of rotation of the virtual camera.

At S1103, the camera movement schedule generation unit 7013 generates schedule information on the moving speed of the virtual camera.

At S1104, the camera movement schedule generation unit 7013 generates schedule information on the zoom movement speed of the virtual camera.

The order of generation at S1102 to S1104 may be changed or it may also be possible to perform each step in parallel.

At S1105, the camera movement schedule generation unit 7013 outputs the schedule information generated at S1102 to S1104 to the camera path generation unit 7015.

The processing at S1101 to S1105 is performed for each frame cycle. After that, unless the CPU 7001 determines that there are end instructions at S1106, the processing is repeated from S1101 again.

Output Flow of Camera Path

Figure 12A:
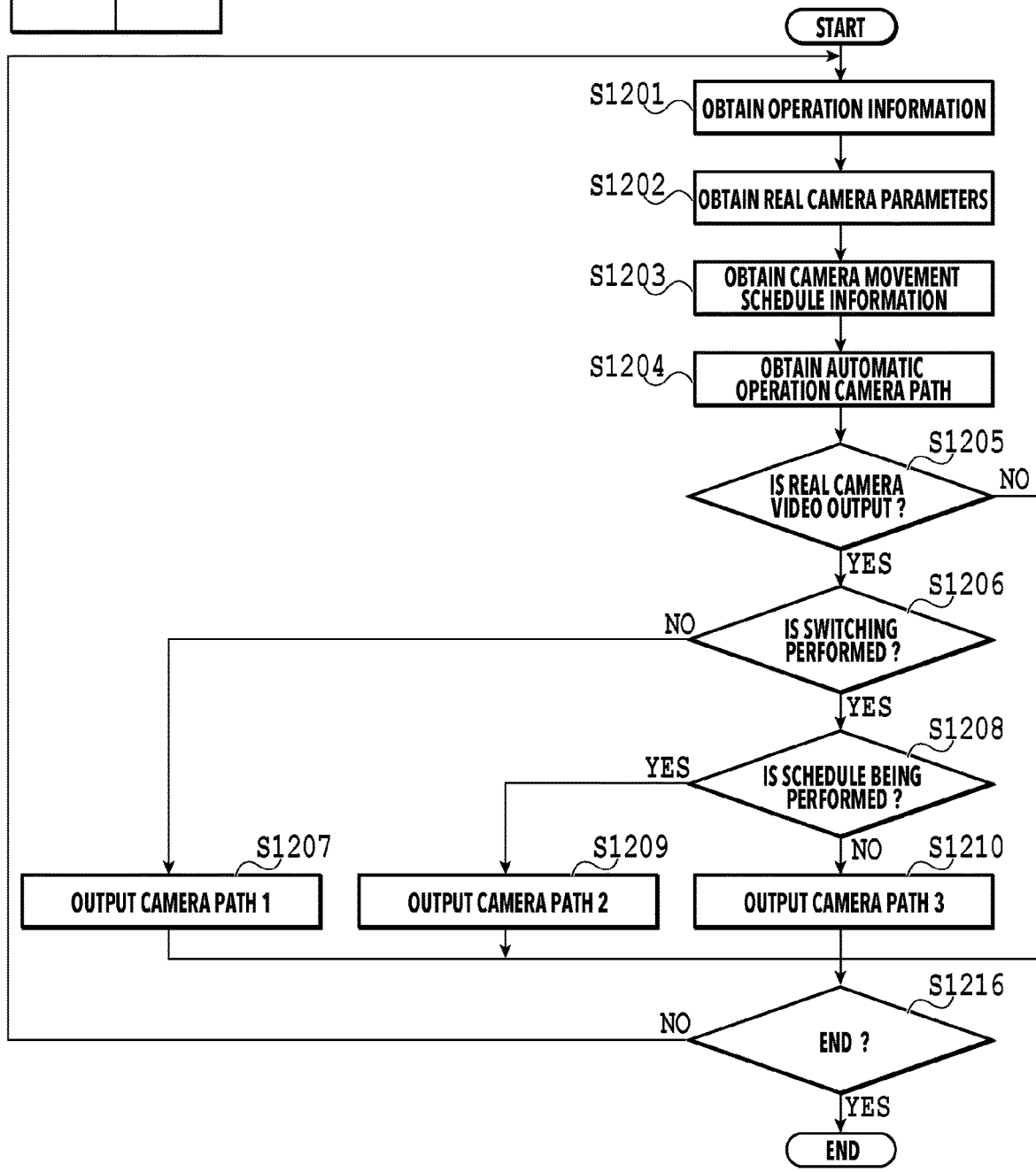
FIG. 12A and FIG. 12B indicate a flowchart of camera path output processing according to the first embodiment.
Figure 12B:
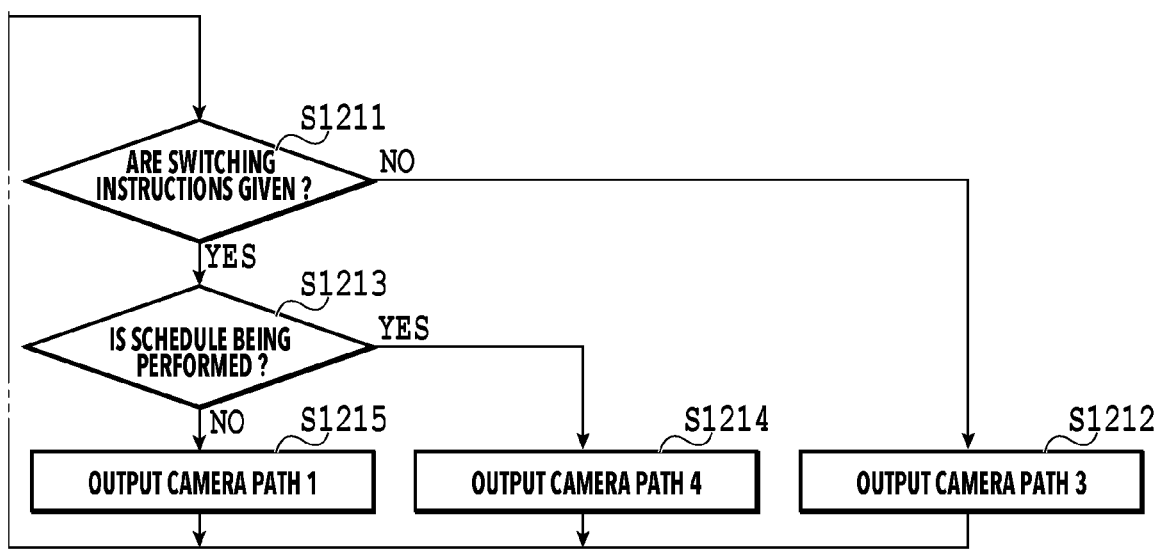

FIG. 12A and FIG. 12B indicate a flowchart showing a flow of camera path output processing according to the present embodiment.

At S1201, the camera path generation unit 7015 obtains operation information. At S1202, the camera path generation unit 7015 obtains real camera parameters. At S1203, the camera path generation unit 7015 obtains camera movement schedule information. At S1204, the camera path generation unit 7015 obtains an automatic operation camera path. The order of S1201 to S1204 may be changed or it may also be possible to perform S1201 to S1204 in parallel.

At S1205, the camera path generation unit 7015 determines whether the video currently being output by the switching device 400 is a real camera video. In a case where determination results at this step are affirmative, the processing advances to S1206 and on the other hand, in a case where the determination results are negative (that is, in a case where the video currently being output by the switching device 400 is a virtual viewpoint video), the processing advances to S1211.

At S1206, the camera path generation unit 7015 determines whether switching from the real camera video to the virtual viewpoint video is being performed (see T102 in FIG. 6). In a case where determination results at this step are affirmative, the processing advances to S1208 and on the other hand, in a case where the determination results are negative, the processing advances to S1207.

In a case where the switching from the real camera video to the virtual viewpoint video is not performed, at S1207, the camera path generation unit 7015 outputs the camera path 1 to the virtual viewpoint video generation device 600.

In a case where the switching from the real camera video to the virtual viewpoint video is already performed, at S1208, the camera path generation unit 7015 determines whether the schedule in accordance with the camera movement schedule is being performed. In a case where determination results at this step are affirmative, the processing advances to S1209 and on the other hand, in a case where the determination results are negative, the processing advances to S1210.

At S1209, the camera path generation unit 7015 outputs the camera path 2 to the virtual viewpoint video generation device 600.

At S1210, the camera path generation unit 7015 outputs the camera path 3 to the virtual viewpoint video generation device 600.

At S1211, the camera path generation unit 7015 determines whether instructions to switch from the virtual viewpoint video to the real camera video are given (see T201 in FIG. 7). In a case where determination results at this step are affirmative, the processing advances to 1213 and on the other hand, in a case where the determination results are negative, the processing advances to S1212.

At S1212, the camera path generation unit 7015 outputs the camera path 3 to the virtual viewpoint video generation device 600.

In a case where the switching instructions are given (YES at S1211), at S1213, the camera path generation unit 7015 determines whether the schedule in accordance with the camera movement schedule is being performed. In a case where determination results at this step are affirmative, the processing advances to S1214 and on the other hand, in a case where the determination results are negative, the processing advances to S1215.

At S1214, the camera path generation unit 7015 outputs the camera path 4 to the virtual viewpoint video generation device 600.

At S1215, the camera path generation unit 7015 outputs the camera path 1 to the virtual viewpoint video generation device 600.

Unless end instructions are given particularly at S1216, the camera path generation unit 7015 performs the processing at S1201 to S1215 for each frame cycle.

Further, in a case immediately after it is determined that the switching is performed at S1206, the camera path generation unit 7015 stops obtaining the camera movement schedule information for switching from the real camera video to the virtual viewpoint video at S1203. Alternatively, the camera path generation unit 7015 obtains the camera movement schedule information, but does not perform updating of the camera movement schedule. Similarly, in a case immediately after it is determined that the switching instructions are given at S1211, the camera path generation unit 7015 stops obtaining the camera movement schedule information for switching from the virtual viewpoint video to the real camera video at S1203.

By the present embodiment, it is possible to lessen the sense of incongruity after the switching between the real camera and the virtual camera and it is possible to provide a viewer with a video experience of a higher feeling of being at a live of performance. In the present embodiment, it is assumed that the real camera 200 and the camera group 500 are cameras that exist in reality, but it may also be possible to replace the cameras with information processing apparatuses (specifically, computers) that simulate the cameras.

Second Embodiment

In the first embodiment, the real camera parameters are generated by using the information from the measurement device, such as the gyroscope and the acceleration sensor, incorporated in the real camera 200 or provided outside the real camera 200. In contrast to this, in the present embodiment, the information processing system separately has a unit separately from the real camera 200, which is configured to estimate part of the real camera parameters.

System Configuration

Figure 13:
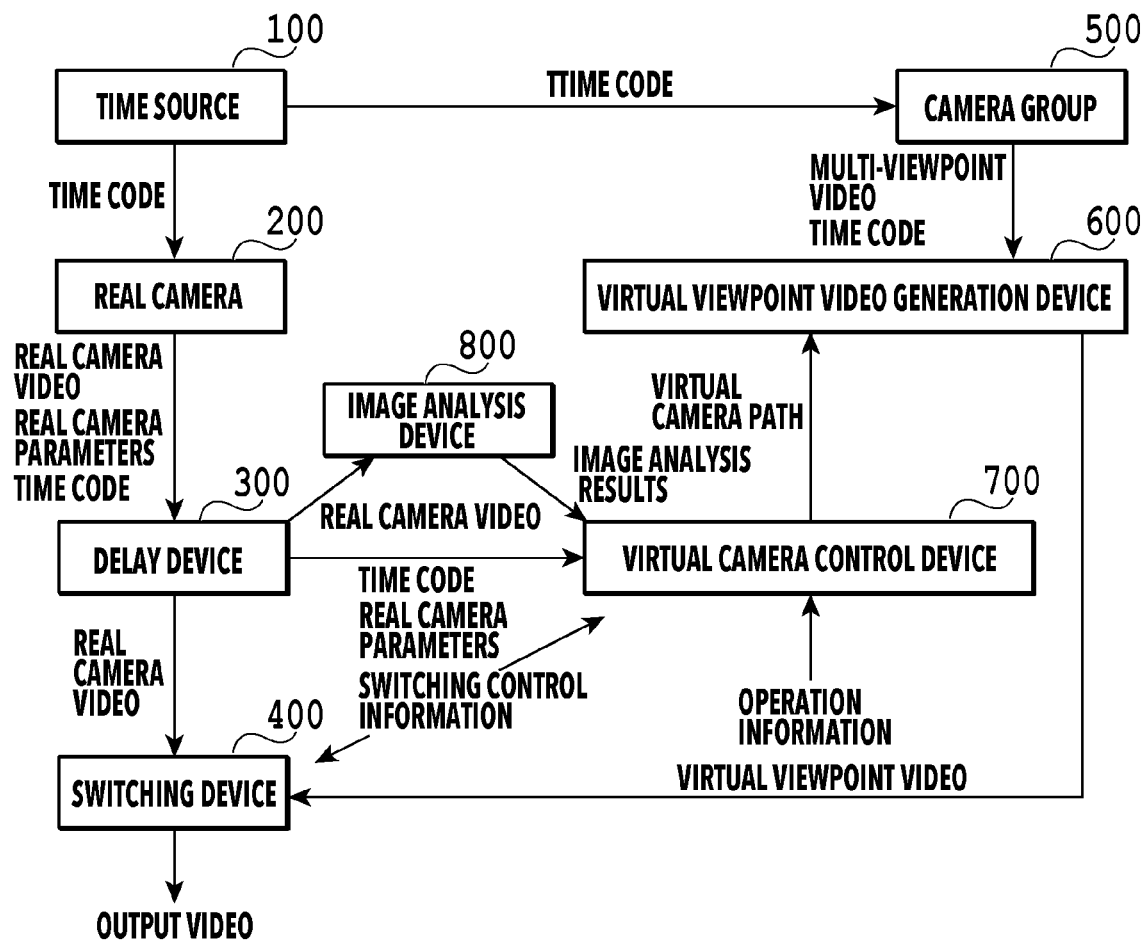
FIG. 13 is a block diagram showing a configuration of a system according to a second embodiment.

FIG. 13 is a block diagram showing the configuration of the information processing system according to the present embodiment. The present system has the time source 100, the real camera 200, the delay device 300, the switching device 400, the camera group 500, the virtual viewpoint video generation device 600, the virtual camera control device 700, and an image analysis device 800. The components other than the image analysis device 800 are the same as those of the first embodiment and it is not necessary for the real camera 200 of the present embodiment to have a measurement unit configured to generate real camera parameters.

To the image analysis device 800, a real camera video that is transmitted by the delay device 300 is input. The image analysis device 800 derives movement information on the real camera 200 based on the input real camera video and outputs the derived movement information to the virtual camera control device 700. It may also be possible to integrate the image analysis device 800 with the virtual camera control device 700.

The movement information that is output from the image analysis device 800 is all or part of the information described in the first embodiment. The image analysis device 800 has a buffer that accumulates real camera videos corresponding to the number of frames, derives the movement information by analyzing the video difference between frames, and outputs the derived movement information for each frame cycle to the virtual camera control device 700. The video difference between flames is derived based on, for example, the amount of movement between frames of the pixel value within the video and the movement direction, or the amount of movement of the position between frames of the objects within the video, the movement direction and the like. Further, at the time of deriving the difference in movement, the amount of movement and the movement direction of the feature point within the video are derived by taking the field line, the structure and the like, whose position do not change in the real space, as the feature point. As the derivation method of a difference in movement, it may also be possible to use another method.

As above, by the present embodiment, even in a case where it is not possible for the real camera 200 to output movement information, by obtaining movement information based on video analysis, it is possible to obtain the same effects at those of the first embodiment.

Third Embodiment

In the first embodiment, the movement of a real camera video is reproduced on a virtual viewpoint video by the real camera 200 outputting real camera parameters and the output real camera parameters being input to the virtual camera control device 700 via the delay device 300. In contrast to this, in the present embodiment, the real camera 200 outputs information other than the movement information and the output information is input to the virtual camera control device 700. As the information other than the movement information, for example, at least one or more of a lens distortion value of the real camera 200 and information indicating a focus state of the real camera 200 are included.

The lens distortion value is determined uniquely by the type of lens and the focal length. Because of this, the real camera parameters that are output by the real camera 200 according to the present embodiment includes lens distortion information as well as the zoom value. The virtual camera control device 700 also outputs the lens distortion information at the time of outputting the virtual camera path to the virtual viewpoint video generation device 600. Then, the virtual viewpoint video generation device 600 reproduces the degree of the lens distortion indicated by the lens distortion information on the virtual viewpoint video.

The focus state is, for example, information representing the degree of focus on the real camera video. Specifically, the value of the degree of focus is set in advance so that the value falls within a predetermined range and in the real camera parameters, the setting value is included. For example, the state of being out of focus is set to 0 and the state of being in focus is set to 10 and the focus state is represented stepwise between an integer value of 1 to 9. The virtual camera control device 700 also outputs information on the focus state at the time of outputting the camera path to the virtual viewpoint video generation device 600. The virtual viewpoint video generation device 600 reproduces the degree of blurring as in the real camera video by performing image processing, such as blurring, for the virtual viewpoint video based on the information on the focus state.

As regards the lens distortion value, it may also be possible for the virtual camera control device 700 to have in advance a table in which the distortion value for each lens focus length is stored and to find the distortion value associated with the focal length indicated by the focal length information within the real camera parameters by using the table.

By the present embodiment, in a virtual viewpoint video, it is possible to reproduce the same degree of lens distortion, the degree of blurring and the like as those of the real camera.

It may also be possible to appropriately combine the contents of the embodiments described previously.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

According to the present disclosure, it is made possible to lessen a sense of incongruity of a user at the time of performing switching between a real camera video and a virtual viewpoint video.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-090059, filed May 28, 2021, which is hereby incorporated by reference wherein in its entirety.

What is claimed is:

1. A system comprising:
an image capturing device;
an information processing apparatus comprising:
one or more memories storing instructions; and
one or more processors executing the instructions to:
obtain image capturing information including information representing a position and an orientation of the image capturing device and movement information representing a shake of the image capturing device; and
generate viewpoint information representing a position of a virtual viewpoint and a view direction from the virtual viewpoint for generating a virtual viewpoint video based on the obtained image capturing information and the obtained movement information in a case where a captured video obtained by the image capturing device and the virtual viewpoint video generated based on a plurality of images are switched; and
generate the virtual viewpoint video based on the plurality of images and the viewpoint information;
wherein the virtual viewpoint video reproduces the shake of the image capturing device.

2. The system according to claim 1, wherein the image capturing information further includes information representing a zoom value.

3. The system according to claim 2, wherein the movement information includes at least one of information relating to rotation of the image capturing device, information relating to movement of the image capturing device, and information relating to zoom movement of the image capturing device.

4. The system according to claim 3, wherein the movement information includes an amount of the shake of the image capturing device; and
the information relating to rotation of the image capturing device includes an amount of rotation of the image capturing device.

5. The system according to claim 3, wherein the information relating to movement of the image capturing device includes an amount of movement in each direction of three-dimensional orthogonal coordinates of the image capturing device.

6. The system according to claim 3, wherein the information relating to zoom movement of the image capturing device includes at least one of a value of zoom in the image capturing device, a movement direction, and a moving speed.

7. The system according to claim 1, wherein the image capturing device has a sensor configured to obtain the movement information.

8. The system according to claim 1, wherein the image capturing information further includes a lens distortion value of the image capturing device and a value of a degree of focus of the image capturing device.

9. The system according to claim 1, wherein the shake of the image capturing device includes movement that is observed in a state where the position and the orientation of the image capturing device are not controlled so that they are changed.

10. The system according to claim 1, wherein the shake of the image capturing device includes movement whose amount of change in the position and the orientation of the image capturing device is smaller than a threshold value.

11. The system according to claim 1 further comprising:
an image capturing device group for obtaining a plurality of images that are used for generation of the virtual viewpoint video;
an output device that output one of the captured video and the virtual viewpoint video.

12. The system according to claim 11, wherein the movement information is obtained by analyzing the captured video.

13. The system according to claim 11, wherein
the output device outputs the virtual viewpoint video in a case where switching from the captured video to the virtual viewpoint video is performed and
in the virtual viewpoint video that is output, movement of the image capturing device before the switching is performed is reproduced.

14. The system according to claim 11, wherein
the output device first outputs the virtual viewpoint video in a case where there are instructions to switch from the virtual viewpoint video to the captured video and
in the virtual viewpoint video that is output, movement of the image capturing device after switching is gradually reproduced.

15. The system according to claim 14, wherein after movement of the image capturing device is reproduced in the virtual viewpoint video that is output, the switching is performed and the output device outputs the captured video.

16. The system according to claim 1, wherein
the viewpoint information is one of first viewpoint information representing an operation by a first operator that operates the image capturing device, second viewpoint information representing an operation by a second operator that operates the virtual viewpoint, to which an operation in accordance with the movement information is added, third viewpoint information representing an operation by the second operator, and fourth viewpoint information representing an operation by an automatic operation mode that performs control so that a difference between a composition of the virtual viewpoint video and a composition of the captured video becomes small, to which an operation in accordance with the movement information is added.

17. The system according to claim 1, wherein
the one or more processors further executing the instructions to obtain operation information of virtual viewpoint for the virtual viewpoint images to be generated; and
the viewpoint information is generated by adding the shake of the image capturing device specified by the motion information to a position and an orientation of the virtual viewpoint specified by the operation information.

18. The system according to claim 1, wherein the addition is performed for a predetermined period of time from the instructions of the switching.

19. A system comprising:
an image capturing device;
an information processing method comprising:
obtaining image capturing information including information representing a position and an orientation of the image capturing device and movement information representing a shake of the image capturing device; and
generating viewpoint information representing a position of a virtual viewpoint and a view direction from the virtual viewpoint for generating a virtual viewpoint video based on the obtained image capturing information and the obtained movement information in a case where a captured video obtained by the image capturing device and the virtual viewpoint video generated based on a plurality of images are switched; and
generate the virtual viewpoint video based on the plurality of images and the viewpoint information;
wherein the virtual viewpoint video reproduces the shake of the image capturing device.

20. A system comprising:
an image capturing device;
a non-transitory computer-readable storage medium storing a program for causing a computer to function as an information processing apparatus comprising:
one or more memories storing instructions; and
one or more processors executing the instructions to:
obtain image capturing information including information representing a position and an orientation of the image capturing device and movement information representing a shake of the image capturing device; and
generate viewpoint information representing a position of a virtual viewpoint and a view direction from the virtual viewpoint for generating a virtual viewpoint video based on the obtained image capturing information and the obtained movement information in a case where a captured image obtained by the image capturing device and the virtual viewpoint video generated based on a plurality of images are switched; and
generate the virtual viewpoint video based on the plurality of images and the viewpoint information;
wherein the virtual viewpoint video reproduces the shake of the image capturing device.

* * * * *